United States Patent [19]

Nonaka et al.

[11] Patent Number: 5,485,544
[45] Date of Patent: Jan. 16, 1996

[54] HISTORY SENSITIVE HELP CONTROL METHOD AND SYSTEM

[75] Inventors: Naomichi Nonaka, Kawasaki; Keiichi Nakane, Yokohama; Tadashi Kuwabara, Yokohama; Hiroyuki Koreeda, Yokohama; Hideki Kuwamoto, Yokohama, all of Japan

[73] Assignee: Hitachi, Ltd., Tokyo, Japan

[21] Appl. No.: 480,672

[22] Filed: Feb. 15, 1990

[30] Foreign Application Priority Data

Feb. 17, 1989 [JP] Japan ..................... 1-36143

[51] Int. Cl.[6] .................................................. G06F 15/20
[52] U.S. Cl. ...................... 395/12; 295/68; 295/50
[58] Field of Search ........................ 364/513, 200, 364/900; 395/68, 12, 50

[56] References Cited

U.S. PATENT DOCUMENTS

| | | | |
|---|---|---|---|
| 4,800,485 | 1/1989 | Acuroff | 364/200 |
| 4,931,926 | 6/1990 | Tanaka | 364/419 |
| 5,239,617 | 8/1993 | Gardner et al. | 395/12 |

FOREIGN PATENT DOCUMENTS

| | | | |
|---|---|---|---|
| 63-98741 | 4/1988 | Japan | G06F 9/44 |
| 63-124148 | 5/1988 | Japan | G06F 12/00 |

OTHER PUBLICATIONS

Imamiya, "Embedding Explanation Mechanism with User Interface", *SPIE* vol. 635 *Applications of Artificial Intelligence III*, 1986, pp. 650–657.
Winston, *Artificial Intelligence*, p. 201. 1984.
Winston & Horn, *LISP*, p. 269 1984.
Parsaye & Chignell, *Expert Systems for Experts*, p. 393, 1988.
Erlandsen et al., "Intelligent Help Systems", *Information and Software Technology*, v. 29 N. 3 Apr. 1987 pp. 115–121.
Frakes et al., "Using Expert–System Components to Add Intelligent Help and Guidance to Software Tools", *Information and Software Technology*, v. 31 N. 7 Sep. 1989 pp. 366–370.
Prager et al, "Reason: An Intelligent User Assistant for Interactive *Environments*", *IBM Systems Journal*, v. 29 N. 1 Jan. 1990 pp. 141–164.
J. Marshall et al., "The Intelligent Help System: Linking a User to System Knowledge", *Proc. IEEE Int'l. Professional Comm. Conf.*, (Oct. 1986), pp. 81–86.
M. Stehouwer and J. Bruggen, "Performing Interpretation in an Intelligent Help System", *Proc. 6th Annual ESPRIT Conf.*, Nov. 27–Dec. 1, 1989), pp. 248–257.
J. Silber, "PAL: An Intelligent Help System", *Proc. 3rd Int'l Conf. on Indus. & Engin. Appl. of Artificial Intelligence & Expert Systems*, (Jul. 1990), pp. 882–889.

*Primary Examiner*—Robert W. Downs
*Attorney, Agent, or Firm*—Antonelli, Terry, Stout & Kraus

[57] ABSTRACT

A system which comprises a message data base for storing help messages, a history buffer for storing the past statuses of an interactive processing system, an inference engine for determining a help message to be outputted, and a rule data base for storing the rules for determining a help message by said inference engine, determines an output help message on the basis of at least the past status history using said inference engine, furthermore outputs a help message by a user's command, selects a message data base to be used by the system at that time from a plurality of message data bases, or selects a rule data base to be used by the system at that time from a plurality of said rule data bases

17 Claims, 11 Drawing Sheets

EXAMPLE OF INFERENCE RULES

○ IF<(THE NEAREST PREVIOUS COMMAND(SF61-1) SPECIFIES DELETION OF THE PREVIOUS ONE CHARACTER) AND
  (THE COMMAND(SF61-2) PREVIOUS BY TWO COMMANDS SPECIFIES RIGHTWARD MOVEMENT OF THE CURSOR) >
  THEN <MESSAGE NUMBER IS 10 WHICH EXPLAINS ABOUT THE COMMAND FOR THE BACKWARD ONE CHARACTER DELETION >

○ IF<(THE NEAREST PREVIOUS COMMAND(SF61-1) SPECIFIES DELETION OF THE PREVIOUS ONE CHARACTER) AND
  (THE COMMAND(SF61-2) PREVIOUS BY TWO COMMANDS SPECIFIES DELETION OF THE PREVIOUS ONE CHARACTER) >
  THEN <MESSAGE NUMBER IS 20 WHICH EXPLAINS ABOUT THE COMMAND FOR WORD UNITS DELETION >

○ IF< CURSOR MOVEMENT COMMANDS ARE EXECUTED SUCCESSIVELY FOR MORE THAN A SPECIFIED TIMES
  (SF61-1=SF61-2=...=CURSOR MOVEMENT COMMAND) >
  THEN <MESSAGE NUMBER IS 30 WHICH EXPLAINS ABOUT THE COMMAND FOR PAGE SCROLLS >

FIG. 10

```
( ( (AND (EQUAL (VALUE HB 1) DELETION-OF-PREVIOUS-ONE-CHARACTER) )
         (EQUAL (VALUE HB 2) RIGHTWARD-MOVEMENT-OF-CURSOR    ) )
    (CLAIM MESSAGE-NUMBER 10)
  ( (AND (EQUAL (VALUE HB 1) DELETION-OF-PREVIOUS-ONE-CHARACTER) )
         (EQUAL (VALUE HB 2) DELETION-OF-PREVIOUS-ONE-CHARACTER) )
    (CLAIM MESSAGE-NUMBER 20)
  ( (AND (EQUAL (VALUE HB 1) UPWARD-MOVEMENT-OF-CURSOR    )
         (EQUAL (VALUE HB 2) UPWARD-MOVEMENT-OF-CURSOR    )
          ......
         (EQUAL (VALUE HB 5) UPWARD-MOVEMENT-OF-CURSOR    )  )  )
    (CLAIM MESSAGE-NUMBER 30)
```

```
RULE DATABASE  : : = (RULE1 RULE2 ······)
RULE           : : = (IF PART THEN PART)
IF PART        : : = EXPRESSION
THEN PART      : : = EXPRESSION
EXPRESSION     : : = (FUNCTION NAME ARGUMENT1 ARGUMENT2 ······)
ARGUMENT       : : = EXPRESSION | ATOM
FUNCTION NAME  : : = ATOM
```

HISTORY SENSITIVE HELP CONTROL METHOD AND SYSTEM

BACKGROUND OF THE INVENTION

This invention relates to a history sensitive help control method and system for displaying a help message in a data processor with reference to the history of past statuses.

In interactive data processors, the help function for displaying information, such as how to use a command according to a user's specific input request, is widely used.

In this case, the contents of a help message to be displayed are not fixed, but more appropriate information is displayed by changing the contents of a message according to a current status (for example, a cursor position or a command mode) so as to improve the system's human interface. Related equipment is indicated, for example, in Japanese Patent Laid-Open 1987-90756, 1986-190658, and 1987-251962.

The above prior art makes it possible to select a help message to be displayed only on the basis of a current status of the equipment. However, the information of only the current status is not sufficient for determining the information which is really required by the user, and so an appropriate message is not always displayed.

SUMMARY OF THE INVENTION

One of the objects of the present invention is to improve the system's human interface by displaying a more appropriate message with reference to not only the current status but also the history of past statuses and to provide a system for efficiently selecting a message from extensive combinations of the history of past statuses.

Another object of the present invention is to allow the user to change the contents of a help message to be displayed and to select the help message to be displayed from a plurality of help messages in response to a user's command so as to display a help message which is more suited to the user.

Another object of the present invention is to allow the user to change the rules for selecting a help message to be displayed so as to select a message more suited to the user and to improve the human interface.

Another object of the present invention is to allow for changing the rules for selecting a help message according to the processing contents performed by the system so as to display a help message which is more suited to the processing contents and to improve the human interface.

Another object of the present invention is to allow for displaying another help message by a user's command when the displayed help message is not appropriate and to improve the human interface.

A further object of the present invention is to allow for easily changing the help message selection rules by expressing the selection rules as data so as to efficiently perform a selection rule development operation.

To accomplish the above objects, a system of the present invention determines a help message to be outputted by fetching at least the past status history of an interactive processing system and by applying inference rules which indicate the relationship between the interactive processing system status and the message to be outputted beforehand to the fetched past status history.

To put it more concretely, a system of the present invention comprises a message data base for storing help messages, a history buffer for storing past statuses of an interactive processing system, an inference engine for determining a help message to be outputted, and a rule data base for storing the rules which are used by the inference engine to determine the message, and determines a help message to be outputted by the inference engine according to at least the past status history.

Furthermore, a system for outputting a help message by a user's command, for selecting a message data base to be used by the system from a plurality of message data bases, or for selecting a rule data base to be used by the system from the above two or more rule data bases is available.

Help control for updating the contents of the above message data base or the contents of the above rule data base is available. As to the function of the help control, it stores a new status in the history buffer when the system status is changed, searches the message data base for a message corresponding to the message number determined by the inference engine when a help request is inputted by the user, and displays the corresponding message.

The inference engine infers and determines a message number to be displayed by matching the inference rules in the rule data base with the data in the history buffer. The history buffer stores the past system statuses in time sequence and the inference engine infers a message number to be determined according to the contents of the history buffer, so that the inference engine can infer a message number to be determined more appropriately compared with the inference method in which the help message is determined only from the current status. The inference rules describe only significant combinations of all the combinations of the past statuses, so that a small storage capacity is sufficient compared with that when message numbers are provided for all the combinations without inference, and the message determination rules can be easily changed because the message numbers for the many corresponding combinations can be changed by changing one rule.

The help control changes a displayed message to a message indicated by the user, selects a message data base to be used, and edits the contents of the message data base or of the rule data base.

The message data base stores the character string to be displayed corresponding to a message number. A plurality of message data bases containing character strings to be displayed corresponding to message numbers written in various languages such as Japanese and English may be provided so as to allow the user to display a help message written in a language in his line by selecting it using the help control function.

Since the contents of the message data base can be edited by help control, the user can edit the contents of the message data base so as to display a more appropriate message.

Since a message other than the message determined by the inference engine in the message data base can be displayed by help control, even if the displayed message is not always appropriate, the user can instruct the help control to display another message so as to search for necessary data.

The rule data base stores the inference rules to be used by the inference engine for determining message numbers.

The help control designates a rule data base to be used by the inference engine from a plurality of rule data bases according to the application processing performed by the system. By doing this, the inference rule can be switched according to the processing to be performed by the system so as to display a help message most suited to the processing.

The history buffer, which stores the past system statuses in time sequence, is updated in value by the help control, and is referred to by the inference engine for determining a message number.

The foregoing and other objects, advantages, manner of operation and novel features of the present invention will be understood from the following detailed description when read in connection with the accompanying drawings.

DETAILED DESCRIPTION OF THE PREFERRED EMBODIMENTS

An embodiment of the present invention will be described hereunder with reference to the accompanying drawings.

Figure 2:
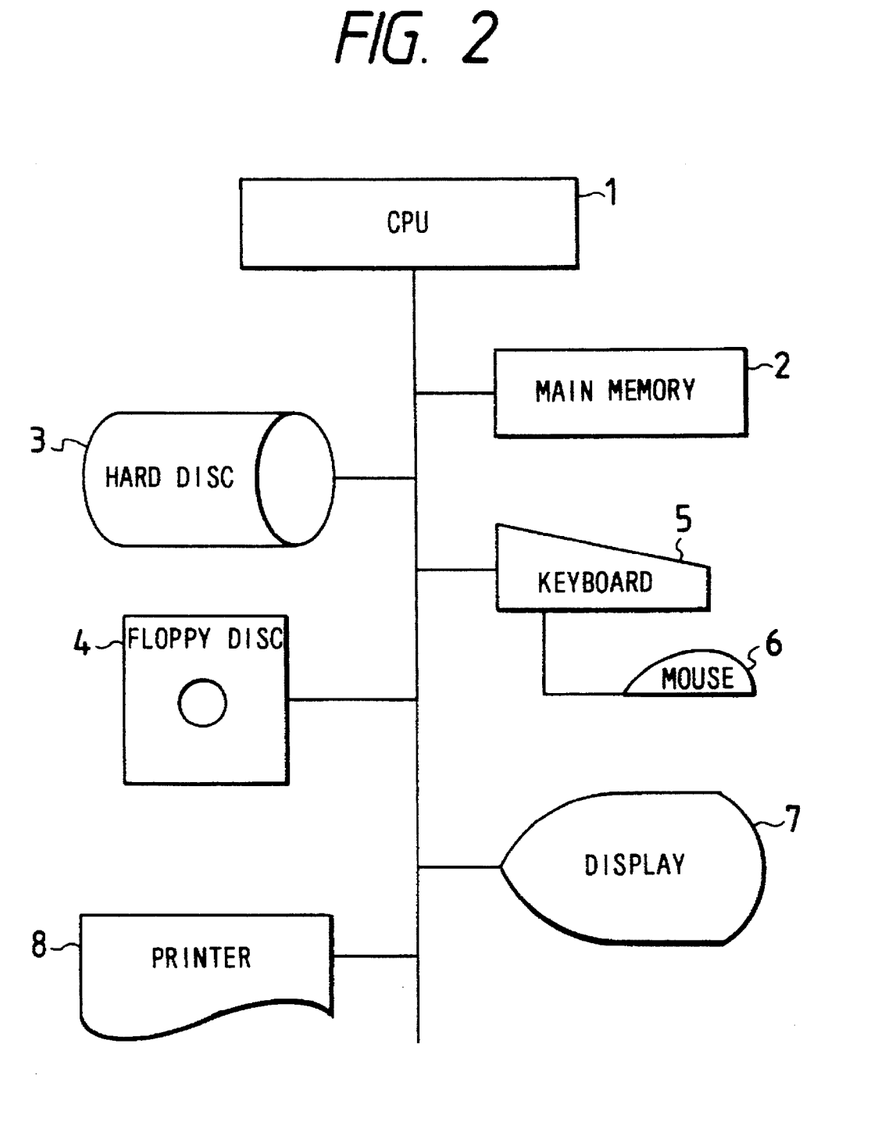
FIG. 2 is a schematic view of an example of hardware operated by an embodiment of the present invention.

FIG. 2 is a schematic view of an example of hardware operated by an embodiment of the present invention.

The hardware of the present invention comprises a CPU (processing unit) 1 for processing data, a main memory 2 for storing programs to be executed by the CPU 1 and data, a hard disc 3 and a floppy disc 4 which are secondary memories for storing programs and data, a keyboard 5 and a mouse 6 for entering characters and functions, a display 7 for displaying processing results and help messages, and a printer 8 for printing processing results.

Figure 1:
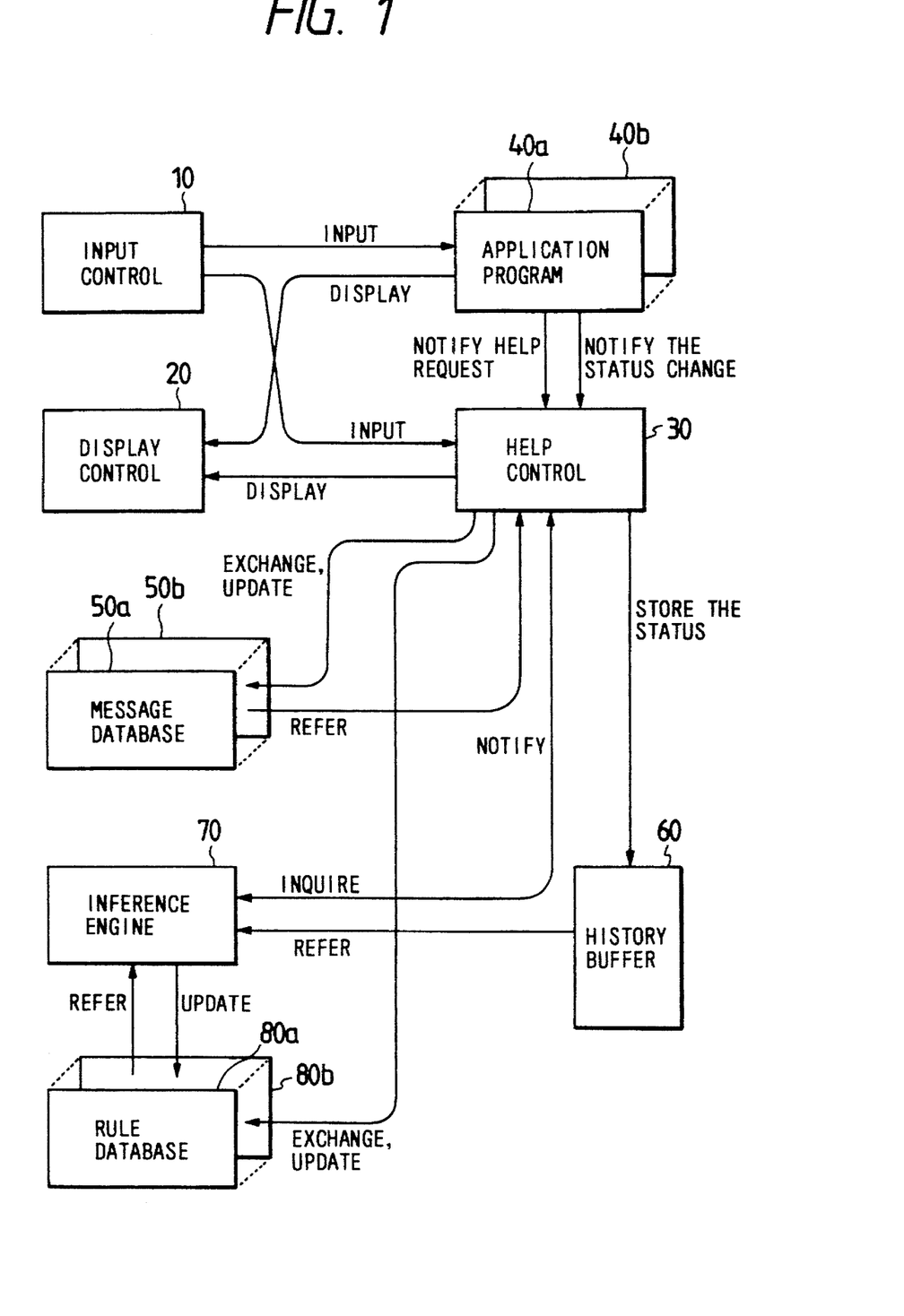
FIG. 1 is a system schematic view of an embodiment of the present invention.

FIG. 1 shows a system schematic view of the present invention.

The input control 10 receives an input from the user through the keyboard 5 or the mouse 6, and stores it in the main memory 2.

Display control 20 displays data on the screen or prints it by controlling the display 7 or the printer 8.

Detailed descriptions of the input control 10 and the display control 20 will be omitted.

An application or user program (hereinafter abbreviated to AP) 40 processes various data, such as receiving and processing an input from the input control 10 and transferring the result to the display control 20 so as to display it. The AP40 may be divided into more than one type of application or user program, such as 40a, 40b, 40c, - - - depending on the data processing contents. In this specification, the reference numeral 40 is used as a general reference (the same may be said with other reference numerals).

The help control 30 stores data in a history data buffer (hereinafter abbreviated to HB) 60 according to the notification from the AP40, determines a message number using an inference engine (hereinafter abbreviated to IE) 70, fetches and displays a help message from a message data base (hereinafter abbreviated to MDB) 50, displays a help message corresponding to a user command, or exchanges or updates the contents of the MDB50 or a rule data base (hereinafter abbreviated to RDB) 80.

The IE70 determines the message number to be displayed according to the contents of the HB60 and of the RDB80 or updates the contents of the RDB80.

The HB60 stores the status history of the AP40.

The MDB50 stores the help message corresponding to a message number. There are more than one MDB50 (MDB50a, MDB50b, - - - ) in the system. However, only one MDB is used at a given point of time, or referred to or updated by the help control 30.

The RDB80 stores the inference rules to be used by the IE70. There are more than one RDB80 in a system in the same way as the MDB50, and only one RDB is used at a given point of time.

Each unit will be described in detail hereunder.

Figure 3:
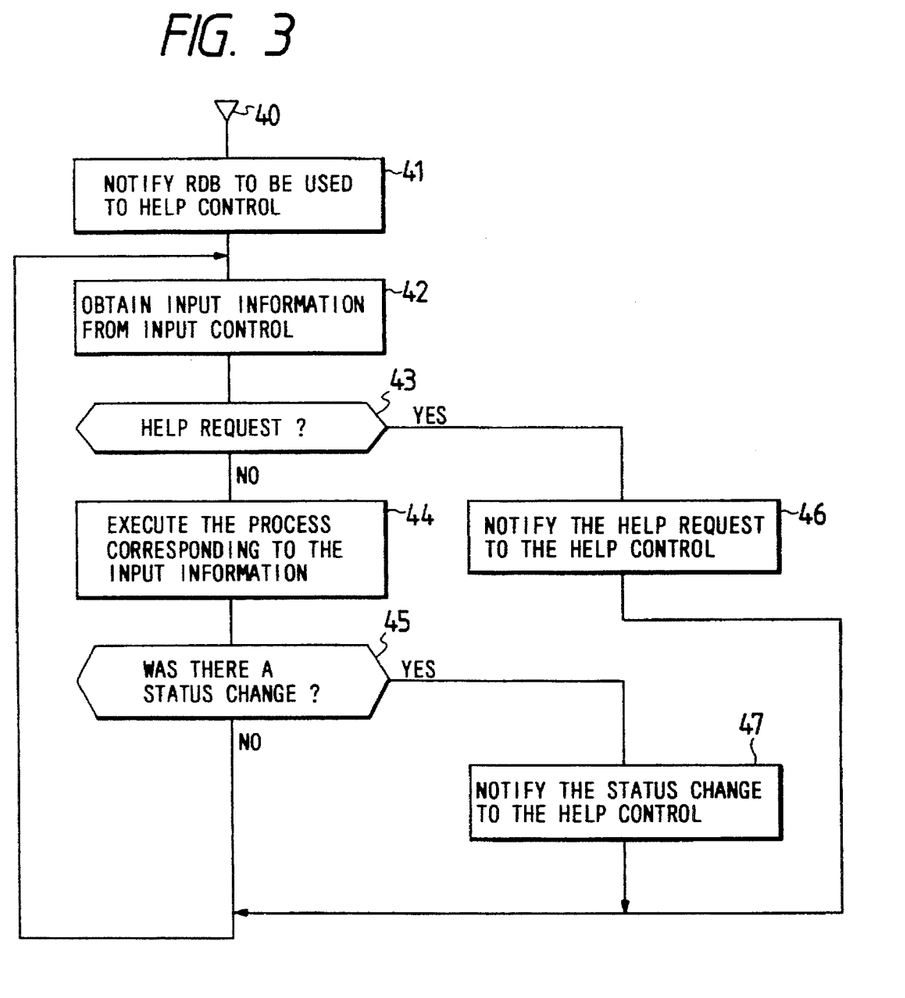
FIG. 3 is a flow chart of the processing of an application program 40.

FIG. 3 shows a flow chart of the processing of the AP40. The AP40 notifies, first, the help control 30 of the type of RDB80 to be used at Step 41, obtains, next, input information from the input control 10 at Step 42, and then decides whether the input information is a help request at Step 43. When the input information is a help request, the application program 40 goes to Step 46. When it is not, the application program 40 goes to Step 44. There are various methods available for designating a help request, such as installation of a dedicated key, simultaneously pressing more than one key, or commanding as a combination of serial keys on the keyboard 5. However, any method which can indicate that the input information is a help request can be used for the present invention.

When the input information is a help request, the application program 40 notifies the help control 30 of a help request at Step 46, returns to Step 42 when the help control 30 finishes the processing, and obtains the next input information. When the input information is not a help request, the application program 40 executes various processing corresponding to the input information at Step 44, and displays or prints data via the display control 20 if necessary. When the processing for the input information is finished, the application program 40 goes to Step 45, and decides whether the status of the application program 40 is changed by the processing at Step 44. When the status is changed, the application program 40 goes to Step 47, notifies the help control 30 of the new status, and returns to Step 42. When the status is not changed, the application program 40 returns immediately to Step 42.

Among the above processing of the AP40, the processing at Step 44 varies with the application program type (40a, 40b, - - - ), and the data processing corresponding to the purpose of each AP40 is performed at Step 44. The contents of the system data processing procedure will not be described.

Next, the data structure will be described.

Figure 4:
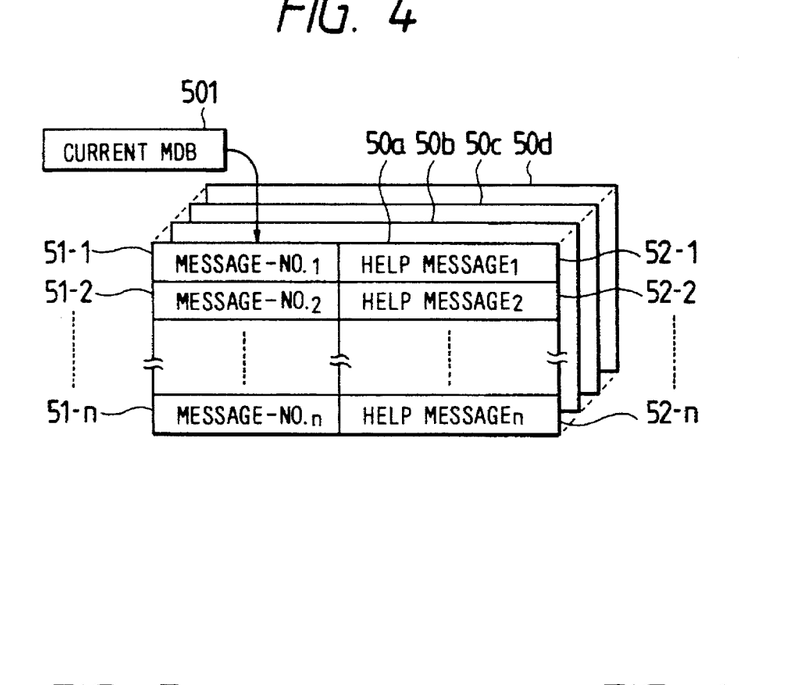
FIG. 4 is a schematic view of a message data base 50.

FIG. 4 is a schematic view of the MDB50 for storing message contents. The MDB50 comprises n pairs of a message number field (hereinafter abbreviated to MNF) 51 and a help message field (hereinafter abbreviated to HMF) 52. The MNF51 stores message numbers which are search keys, and the HMF52 stores help messages to be displayed.

There are more than one MDB50 in a system, such as MDB50a, MDB50b, - - - . Current MDB501 is used to instruct a MDB which is used at present by the system from the plurality of MDBs.

Figure 5:
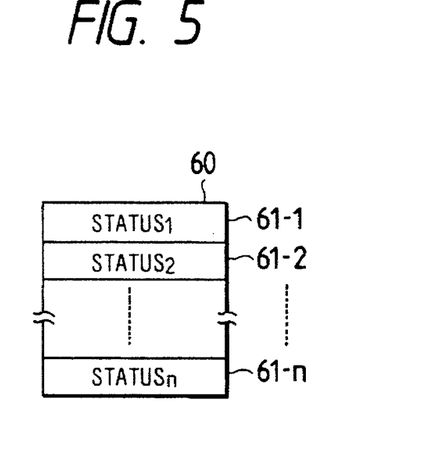
FIG. 5 is a schematic view of a history buffer 60.

FIG. 5 is a schematic view of the HB60 which stores the status history. The HB60 comprises m status fields 61. The first value SF61-1 of the status field (hereinafter abbreviated to SF) 61 indicates the current status, and SF61-2 indicates the nearest previous status and SF61-3 indicates the status previous by two statuses sequentially.

Figure 6:
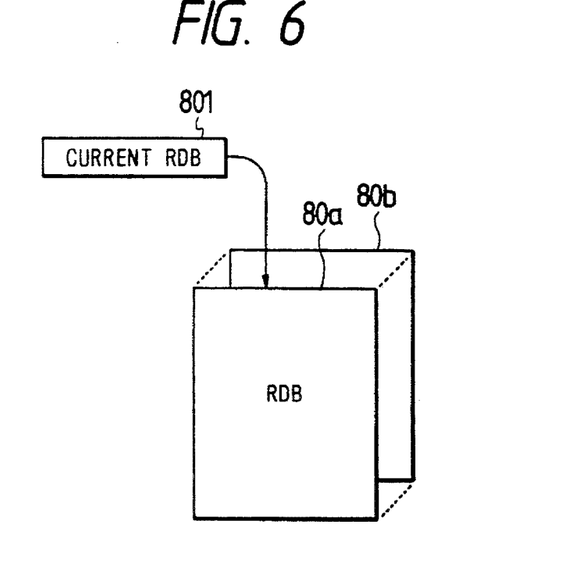
FIG. 6 is a schematic view of a rule data base 80.

FIG. 6 shows a RDB80 which stores the inference rules for determining a help message. There are more than one RDB80 in a system in the same way as the MDB50, and the RDB indicated by Current RDB801 is the one which is used by the system at present.

The contents of the RDB80 will be described later.

Next, the processing of the help control 30 will be described.

Figure 7A:
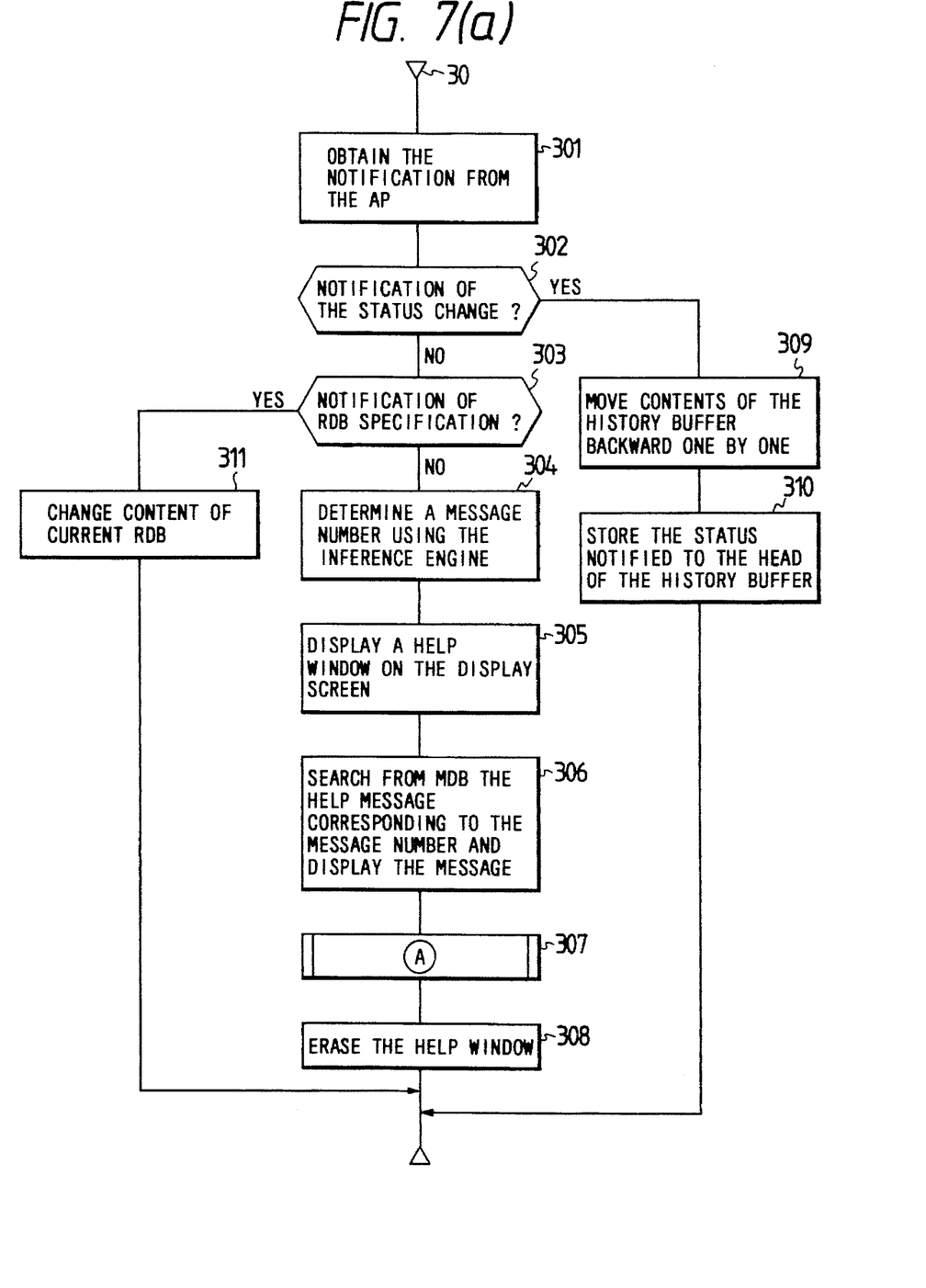
FIGS. 7(a) and 7(b) are flow charts of help control 30.
Figure 7B:
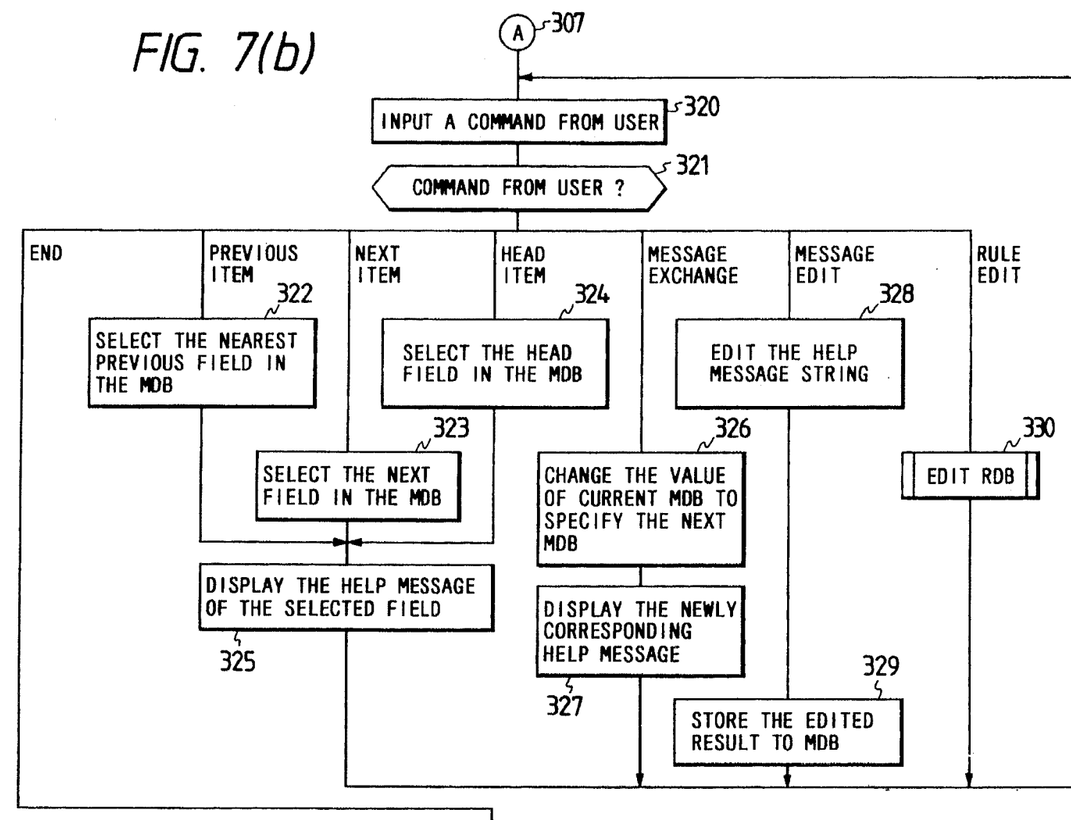

FIG. 7 shows a flow chart of the help control 30. The help control 30 receives, first, the notification from the AP40 at Step 301, and identifies the contents of the notification at Steps 302 and 303. When the notification is a status change notification, the help control 30 goes to Step 309. When the notification is a RDB designation notification, the help control 30 goes to Step 311. When the notification is another one, that is, a help request notification, the help control 30 goes to Step 305.

At Step 309 when the help control 30 receives a status change notification, the help control updates the contents of the HB60 so that the latest n statuses are stored in the HB60; that is, stores the SF61 value at the second from the end in the last SF61, then stores the SF61 value at the third from the end in the second SF61 from the end. The same operation is repeated sequentially, and the help control 30 stores the first SF61 value in the second SF61, and handles the first SF61 as an unused status field. Then, the help control 30 stores the status value notified at Step 310 in SF61-1, and terminates the processing.

At Step 311 when the help control 30 receives a RDB designation notification, the help control stores the notified contents in the current RDB801 and changes the RDB to be used, and terminates the help control processing.

At Step 304 when the help control 30 receives a help display request, the help control inquires and requests a message number to be displayed for the IE70. Upon reception of the inference result from the IE70, the help control 30 determines the message number to be displayed. The IE70 will be described later.

Figure 8:
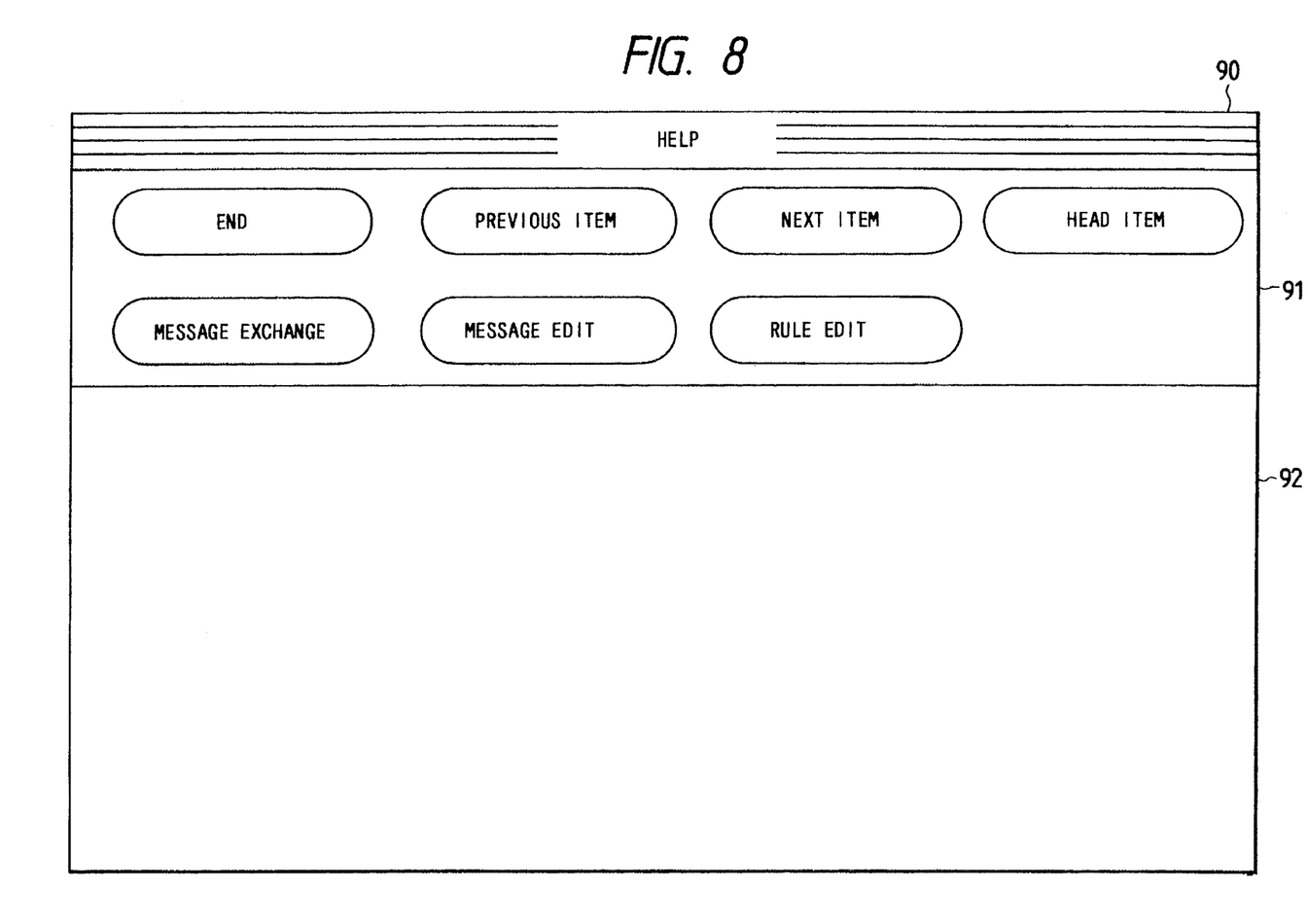
FIG. 8 is a screen schematic view of a help window 90.

At Step 305, the help control 30 instructs the display control 20 to display a help window 90 on the display 7. FIG. 8 shows a screen configuration of the help window 90. As shown in FIG. 8, the help window 90 comprises a command area 91 and a display area 92. The command area 91 is used for instructing the help control 30, and the display area 92 is used for displaying an output from the help control 30. The command area 91 will be described later.

At Step 306, the help control 30 searches the inside of the MDB50 indicated by the current MDB501, finds HMF52 which matches the message number to be displayed by MNF51, and displays the corresponding HMF52 contents in the display area 92 via the display control 20.

At Step 307, the help control 30 performs processing corresponding to the user's command, erases the help window 90 at Step 308 when the termination is instructed by the user, and terminates the help control processing.

The processing at Step 307 is as follows:

The help control 30 inputs a user's command at Step 320 first. When the user instructs each command displayed in the command area 91 by operating the mouse 6, the user's command is inputted into the help control 30 via the input control 10. The following seven commands can be outputted by the user: "Termination", "Previous Item", "Next Item", "Head Item", "Message Change", "Message Edit", and "Rule Edit" as shown in FIG. 8.

At Step 321, the help control 30 identifies the user's command, and performs the corresponding processing. When the command is "Termination", the help control 30 immediately terminates the processing at Step 307, and goes to Step 308.

When the command is "Previous Item", the help control 30 goes to Step 322 and selects the previous field in the MDB50. The previous field is MNF51-(i−1) for MNF51-i with the message number displayed at present. Then, the help control 30 displays the contents of HMF52 corresponding to MNF51 selected at Step 325 in the display area 92, returns to Step 320, and accepts the next input.

When the command is "Next Item", the help control 30 goes to Step 323, selects the next field in the MDB50, and then goes to Step 325 and displays the contents of HMF52 corresponding to MNF51 selected in the same way as with "Previous Item". The next field is MNF51-(i+1) for MNF51-i.

When the command is "Head Item", the help control 30 goes to Step 324 and selects the head field in the MDB50 or MNF51-1, and then goes to Step 325 in the same way and displays the corresponding HMF52-1 contents.

When the command is "Message Change", the help control 30 goes to Step 326 and changes the value of the current MDB501 so as to display the next MDB. The next MDB is MDB50b for MDB50a or MDB50c for MDB50b, and is defined sequentially in the same way. MDB next to the last MDB50d is MDB50a, and by changing the message sequentially, all MDBs can be selected.

Then, at Step 327, the help control 30 displays the help message corresponding to the message number in the display area 92 by using the newly selected MDB50. The message number displayed in this case is the same, though a different character string is displayed on the screen because MDB50 is changed. After displaying the message, the help control 30 returns to Step 320 and accepts the next input.

When the command is "Message Edit", the help control 30 goes to Step 328 and edits the help message displayed in the display area 92.

The processing to be performed at Step 328 is character string editing which inputs a user's edit command such as insertion or deletion, performs a corresponding edit operation, and displays the result in the display area 92. This processing is widely used as processing by a text editor on a computer, and hence detailed descriptions will be omitted.

When "Termination" in the command area 91 is instructed, the help control 30 terminates the editing at Step 328 and stores the character string of edit result in HMF52 of MDB50 at Step 329, and then returns to Step 320 and accepts the next input.

When the command is "Rule Edit", the help control 30 goes to Step 330 and edits the RDB80 contents, and then returns to Step 320 when the processing is terminated and accepts the next input. The contents of the processing at Step 330 will be described later with reference to FIG. 14.

A technique called a production system is used for determination of a message number to be displayed. The production system comprises the IE70, RDB80, and HB60, and performs a backward inference for the notification contents from the help control 30 as a goal, and notifies the help control 30 of the obtained inference result. A RDB to be used in this case is the one indicated by the current RDB801.

"Backward inference" is an inference method in which a conclusion is assumed first and an inference is made by deciding whether the condition is satisfied or not. The RDB80 stores the inference rules consisting of pairs of condition and conclusion parts, and the HB60 is used as data for deciding the condition of the inference rules. For the production system, refer to Chapter 5 of "ARTIFICIAL INTELLIGENCE" (P. H. Winston, Addison-Wesley, 1977).

Figure 9:
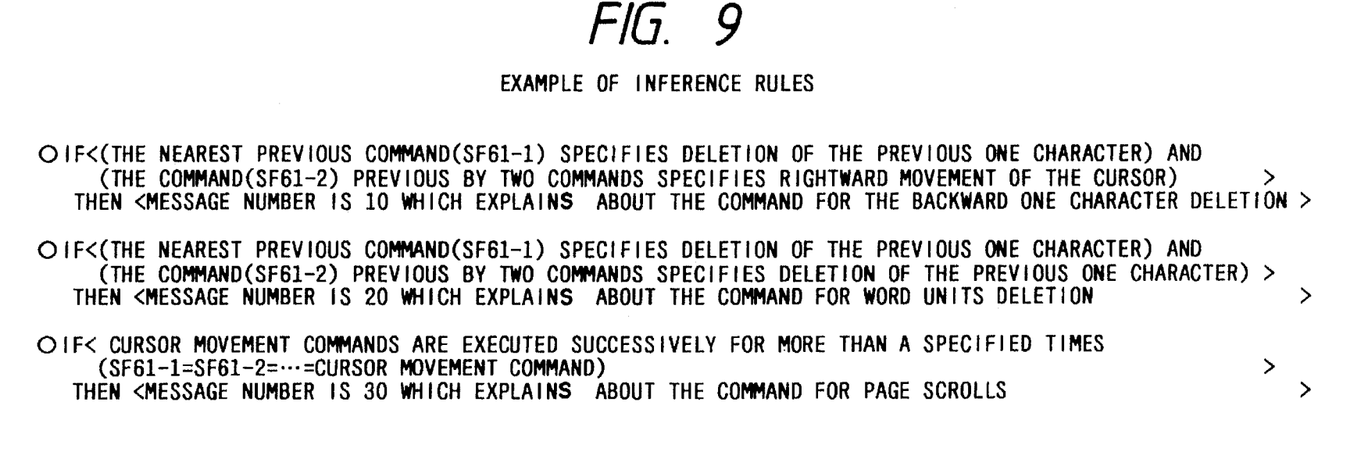
FIG. 9 shows an example of inference rules described in the natural language.

FIG. 9 shows an example of the inference rules. The rules indicated here are just an example. The rules shown in FIG. 9 are described in the natural language, though the rules are stored in the RDB80 in a different format.

A goal which is set by an inquiry from the help control 30 uses a format of "Message Number?", and the message number is determined by a backward inference and sent to the help control 30.

The inference rules in the RDB80 are sequenced, and the rules are sequentially applied for inference starting with the first one. When there are a plurality of rules which satisfy the condition in the RDB80, the result of the rule applied first is used. Although not indicated in the example, therefore, a rule whose condition part is surely satisfied may be set at the end of the rules and a message number when an appropriate rule is not found may be stored in the conclusion part so as to perform processing when an inference cannot be well performed without imposing a burden on the help control 30.

An operation for changing the RDB80 contents is described as a rule conclusion part. Providing a so called meta-rule allows the RDB80 contents to be automatically changed.

Figure 10:
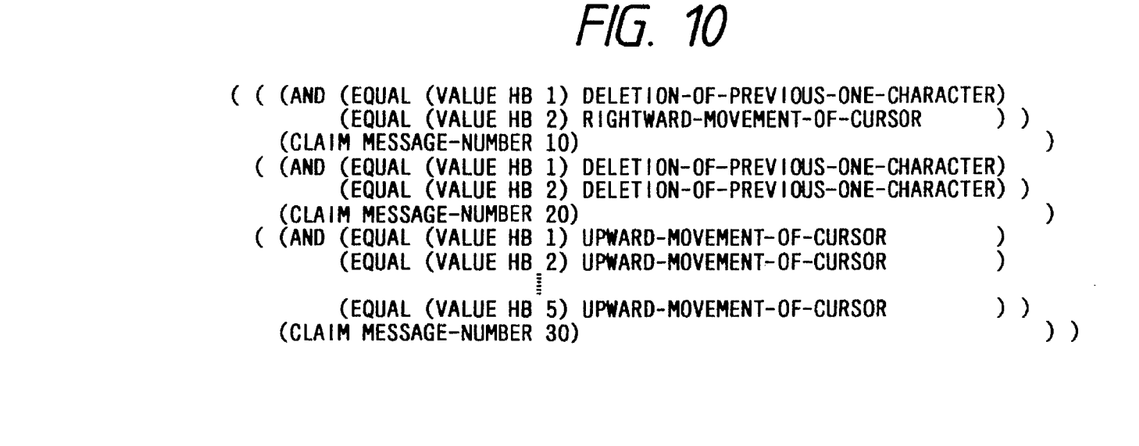
FIG. 10 shows an example of inference rules described in the S expression.

Next, the data structure in the RDB80 will be described. The rules stored in the RDB80 use a binary tree format, and the contents are displayed or inputted in the S expression format. FIG. 10 shows the rule example shown in FIG. 9 which is described in the S expression format, and FIG. 11 shows the rule example described in the S expression format shown in FIG. 10 which is described in the binary tree format (a part is omitted).

As shown in FIG. 10, the S expression is a character string which has a structure that a character string in parentheses is nested to multiple depth, and a minimum unit of the structure such as "AND", "EQUAL", or "Deletion of previous one character" shown in the figure is called an atom.

Figure 11:
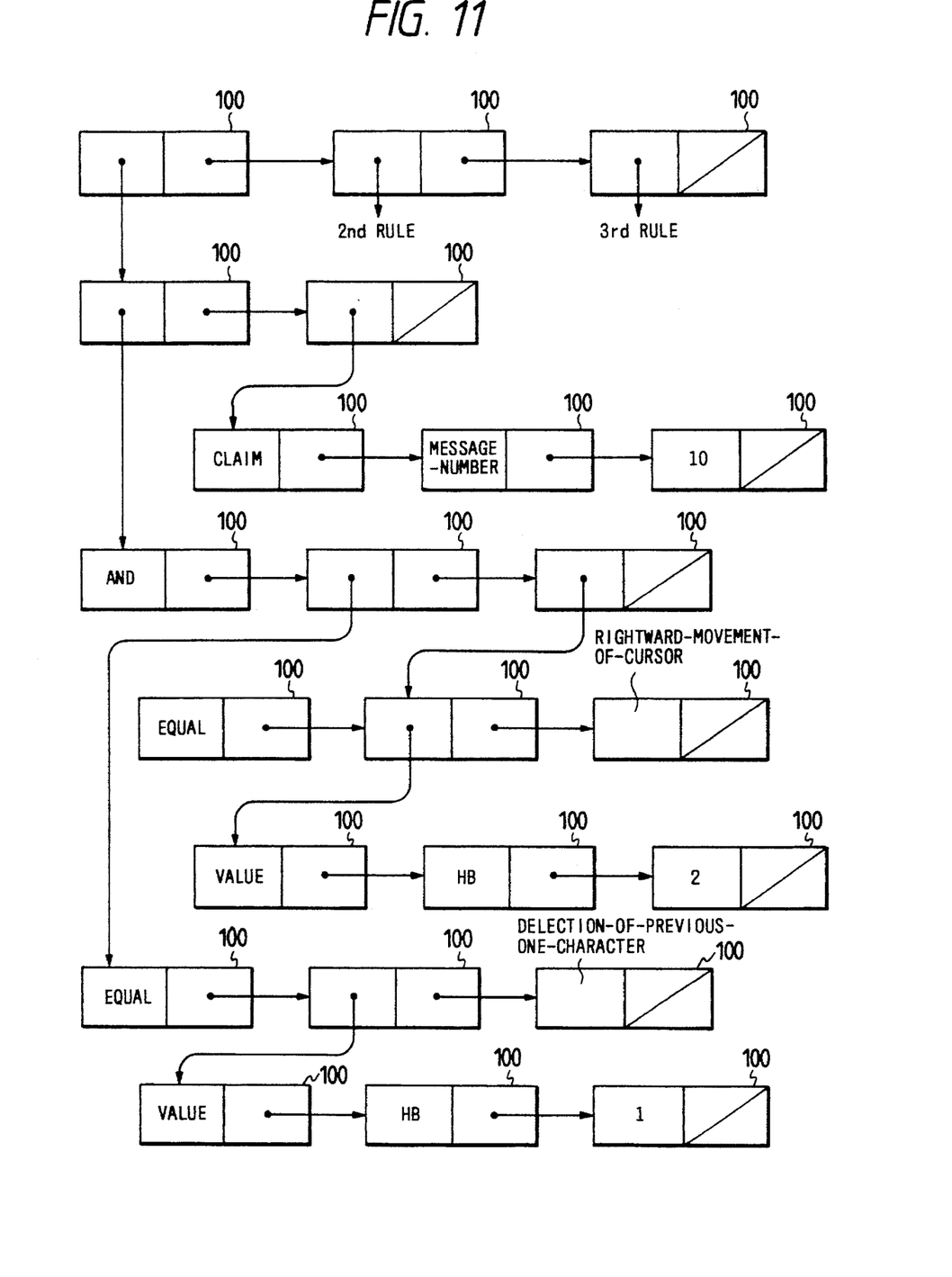
FIG. 11 shows an example of inference rules described in the binary tree format.
Figure 12:
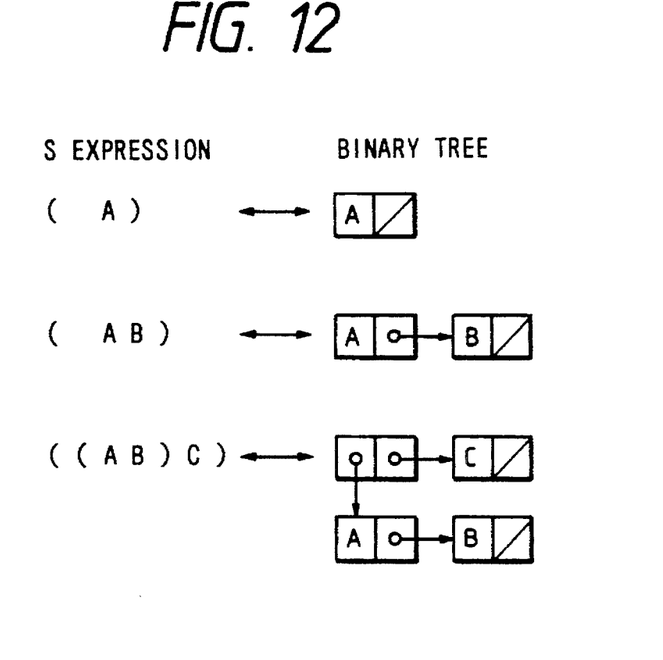
FIG. 12 shows a correspondence example between the S expression and the binary tree list.

As shown in FIG. 11, the binary tree is an aggregate of cells of reference number 100 (cons cells in the LISP language). Each cell 100 has two fields, right and left, and each field indicates another cell 100, an atom, or nothing (a diagonal line in the figure). The binary tree has a one-to-one correspondence with the S expression, and the two can be converted to each other. FIG. 12 shows a correspondence example between the S expression and the binary tree.

The binary tree and the S expression are data structures widely used in the programming language LISP, hence further descriptions will be omitted. For the programming language LISP, refer to "LISP", 3rd Edition (P. H. Winston and B. K. Horn, Addition-Wesley, 1988).

Figure 13:
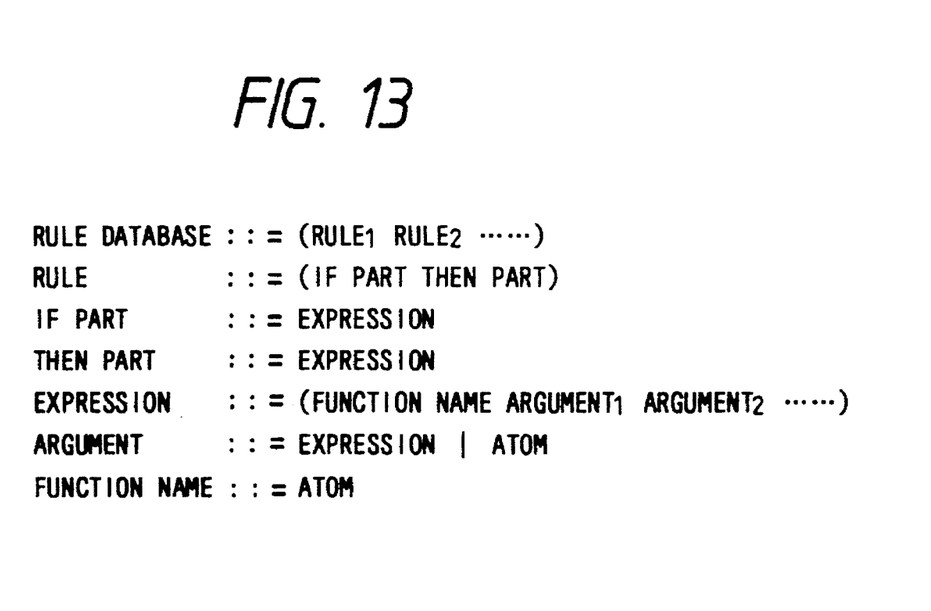
FIG. 13 shows a RDB80 description syntax.

FIG. 13 shows the syntax for describing the RDB80 in the S expression format by the extended BNF (backus normal form) notation. As shown in the figure, the RDB80 is a list of rules, each of which is enclosed by parentheses. Each rule is a list of an IF part and a THEN part, and the IF part indicates the condition under which the rule is satisfied, and the THEN part describes the processing to be performed when the rule is satisfied.

The IF and THEN parts are expressions which are described by functions. A function of f with n arguments is described by $f(x_1, x_2, ---, x_n)$ in a mathematical expression, though the function of f is described by $(f\ x_1\ x_2\ ---\ x_n)$ in the S expression. In this example, the function name is "atom" and each argument is an expression or an atom.

An atom which can be used for describing an expression is determined by each system, and the IE70 interprets the meaning of each atom and performs the corresponding processing. In the rule example shown in FIG. 10, AND designates a function which is satisfied when all the arguments are satisfied, EQUAL a function which is satisfied when two arguments are equal to each other, VALUE a function which uses the element at the position indicated by the second argument of the data structure indicated by the first argument as a value, and CLAIM a function which assumes the value of the first argument as a second argument. The IE70 evaluates the expression in the IF part by interpreting the meaning of each atom like this for each rule. When the result is a true value, the IE70 evaluates the expression in the THEN part, and repeats the above operations for inference.

Figure 14:
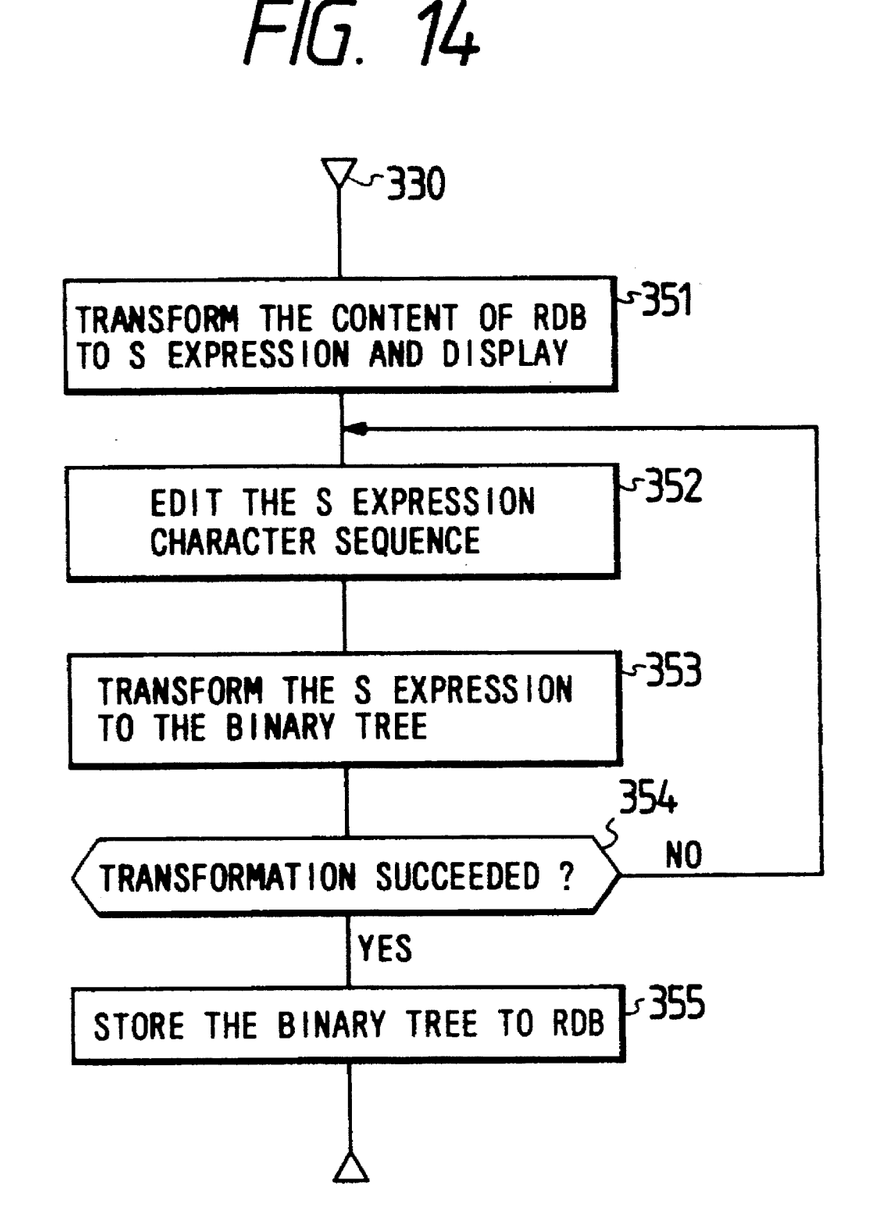
FIG. 14 is a flow chart of the RDB edit processing which is a part of the processing of the help control 30.

FIG. 14 shows a flow chart of the RDB editing by the help control 30 at Step 330.

In the RDB editing, the help control 30 converts the inference rules stored in the RDB80 and described in the binary tree format to ones described in the S expression format at Step 351 and displays them in the display area 92.

At Step 352, then, the help control 30 edits the S expression which is a character string. This character editing is the same as the character string editing of a help message to be processed at Step 328.

When the character string editing is terminated, the help control 30 goes to Step 353 and converts the edit result described in the S expression format to the one described in the binary tree format. Since there are possibilities that the format cannot be converted for some reason such that a correspondence of parentheses is not correct or an atom which is not defined by the system is described, the help control 30 decides whether the conversion succeeds or not. When the conversion does not succeed, the help control 30 returns to Step 352 and edits the S expression once again.

When the conversion succeeds, the help control 30 goes to Step 355, stores the conversion result in the RDB80, and terminates the RDB editing at Step 330.

A help message is displayed by the above function of each unit.

Since a help message is determined according to the HB60 contents in this embodiment, a more appropriate help message can be selected than the one which is selected according to only the current status, and the system's human interface is improved.

Since the message determination rule in the RDB80 is independent of other parts, the determination rule can be easily changed, and an operation that the rule is modified by using user's opinions can be efficiently performed.

Furthermore, since the help messages to be displayed in the MDB50 are independent of the message determination rule, not only the mode of expression can be easily changed but also a plurality of help messages described in a plurality of languages can be provided. As a result, a help message written in a language which is in the user's line can be displayed and the system's human interface is improved.

Since the contents of the MDB50 or RDB80 can be changed by the user, the message representation or determination rule can be changed according to the intrinsic user circumstances.

In this embodiment, the IE70 is a program which is executed by the CPU 1. However, it is clear that in the present invention, the IE70 can be used as a program which is executed by another CPU or dedicated hardware.

Since, in this embodiment, when a displayed message is not appropriate, another message can be displayed by a user's command, even if an inference is imperfect, necessary help data can be obtained by a user's operation.

Since, in the present invention, a help message to be displayed in consideration of not only the current status but also the history of last statuses can be determined, a more appropriate help message can be displayed and the system's human interface is improved.

Since a help message is determined according to the contents of the rule data base, the message determination rule can be easily changed and the development efficiency can be improved.

Since a help message to be displayed is determined according to the contents of a message data base other than the rule data base and the message representation format can be changed independently of the message determination rule, processing such that the message representation language is changed to another one can be easily performed, the development efficiency can be improved, a help message can be expressed in a language which is in the user's line, and the system's human interface is improved.

Since the message contents or determination rule can be changed by the user, a help message which is appropriate to the intrinsic condition for each user can be displayed and the system's human interface is improved.

Since, when a displayed message is not appropriate, another message can be displayed, not only the message determination method can be changed as mentioned above, but also the help message can be adjusted by the user.

What is claimed is:

1. In an interactive processing system having a function of outputting a help message, a help control method, comprising the steps of:

storing help messages in a message database;

storing inference rules in a rule database;

obtaining through use of a user program at least a history of past statuses resulting from execution of commands by said user program;

applying inference rules, stored in said rule database, to said history of past statuses for selecting held messages, each of said inference rules being related to a relationship between a status of said user program and a help message to be outputted; and obtaining, from help messages stored in said message database, a help message selected on the basis of a result of said applying step.

2. A help control method according to claim 1, wherein said help message is determined in response to a help request processed by said user program.

3. A help control method according to claim 1, wherein said inference rules are applied to a current status and said history of past statuses of said user program in said applying step.

4. A help control method according to claim 1, wherein said inference rules are described by a production system.

5. A help control method according to claim 1, wherein said history of past statuses comprises statuses of said user program which are stored in time sequence.

6. A help control method according to claim 1, further comprising the step of:

changing at least one stored help message in said message database at least by processing by said user program.

7. A help control method according to claim 1, further comprising the step of:

changing at least one stored inference rule in response to said user program.

8. In an interactive processing system having a function for outputting a help message, a help control system comprising:

a message database for storing help messages;

a rule database for storing inference rules;

means for obtaining through use of a user program at least a history of past statuses resulting from execution of commands by said user program;

means for applying inference rules, stored in said rule database, to said history of past statuses for selecting help messages, each of said inference rules being related to a relationship between a status of said user program and a help message to be outputted; and means for outputting, from help messages stored in said message database, a help message selected on the basis of a result of operation of said applying means.

9. A help control system according to claim 8, wherein said help message is determined for a help request processed by said user program.

10. A help control system according to claim 8, wherein said inference rules are applied to a current status and said history of past statuses of said user program in said applying means.

11. A help control system according to claim 8, wherein said inference rules are described by a production system.

12. In a data processor which performs interactive processing, a help control system comprising:

first means responsive to execution of commands in a user program for storing a history of changes in status of said user program;

second means for storing rules for determining help messages to be displayed on the basis of said stored history of changes in status;

third means for storing help messages to be displayed on the basis of said history of changes in status of said user program;

fourth means for determining a help message according to the history of changes in status stored by said first means and said rules stored by said second means; and fifth means for displaying a help message determined by said fourth means.

13. A help control system according to claim 12, wherein said first means stores status changes in time sequence.

14. A help control system according to claim 12, wherein said help messages of said third means can be changed at least by said user program.

15. A help control system according to claim 12, wherein said rules of said second means can be changed by the said user program.

16. A help control system according to claim 12, wherein a plurality of said second means are provided each in correspondence with respective ones of a plurality of user programs.

17. A help control system according to claim 12, wherein a plurality of said third means are provided each in correspondence with respective ones of a plurality of user programs.

* * * * *